United States Patent
Kim

(10) Patent No.: US 8,105,713 B2
(45) Date of Patent: Jan. 31, 2012

(54) ELECTRODE ASSEMBLY WITH SEPARATED SUPPORT TAPES IN SECONDARY BATTERY

(75) Inventor: Jae-Woong Kim, Asan-si (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 783 days.

(21) Appl. No.: 10/963,618

(22) Filed: Oct. 14, 2004

(65) Prior Publication Data

US 2005/0084753 A1 Apr. 21, 2005

(30) Foreign Application Priority Data

Oct. 15, 2003 (KR) .................. 10-2003-0071949

(51) Int. Cl.
*H01M 2/10* (2006.01)
*H01M 4/00* (2006.01)
*H01M 2/02* (2006.01)

(52) U.S. Cl. .................. 429/186; 429/94; 429/164
(58) Field of Classification Search .............. 429/94, 429/164, 186
See application file for complete search history.

(56) References Cited

U.S. PATENT DOCUMENTS

| | | | |
|---|---|---|---|
| 5,834,133 A * | 11/1998 | Narukawa et al. | 429/171 |
| 6,506,514 B1 * | 1/2003 | Endo et al. | 429/94 |
| 6,544,684 B2 * | 4/2003 | Onishi et al. | 429/146 |
| 6,743,546 B1 * | 6/2004 | Kaneda et al. | 429/127 |

FOREIGN PATENT DOCUMENTS

| | | | |
|---|---|---|---|
| JP | 10-208769 A | | 8/1998 |
| JP | 2003-123843 A | | 4/2003 |
| JP | 2003123843 A | * | 4/2003 |
| JP | 2003-187874 A | | 7/2003 |

OTHER PUBLICATIONS

Japanese Notice of Allowance issued by JPO, dated Apr. 8, 2011, corresponding to Japanese Patent Application No. 2004-297596, together with Request for Entry.

* cited by examiner

*Primary Examiner* — Karie O'Neill Apicella
(74) *Attorney, Agent, or Firm* — Robert E. Bushnell, Esq.

(57) ABSTRACT

Separated support tapes are attached to an electrode assembly which includes a negative electrode plate, a positive electrode plate, and a separator for performing charge and discharge operations. The separated support tapes are attached to a lower portion of the electrode assembly so as to allow the electrode assembly to be easily inserted into a can, while reducing the possibility of fire in a secondary battery caused by a hard short when the secondary battery is compressed due to external force applied thereto, preventing battery performance from being deteriorated by allowing electrolyte to sufficiently flow into a lower portion of the electrode assembly, and reducing a manufacturing cost of the secondary battery by minimizing the amount of separated support tape to be used.

18 Claims, 3 Drawing Sheets

ELECTRODE ASSEMBLY WITH SEPARATED SUPPORT TAPES IN SECONDARY BATTERY

CLAIM OF PRIORITY

This application makes reference to, incorporates the same herein, and claims all benefits accruing under 35 U.S.C. §119 from my application JELLY ROLL WITH SEPARATE SUPPORT TAPE IN SECONDARY BATTERY filed with the Korean Industrial Property Office on 15 Oct. 2003 and there duly assigned Serial No. 2003-71949.

BACKGROUND OF THE INVENTION

1. Technical Field

The present invention relates to a secondary battery and, more particularly, to separated support tapes having an improved structure and attached to a lower portion of an electrode assembly in order to allow the electrode assembly to be easily inserted into a can of a prismatic type secondary battery.

2. Related Art

A secondary battery has an electrode assembly including a positive electrode plate, a negative electrode plate, and a separator. The electrode assembly is accommodated in a can made from aluminum or an aluminum alloy, and an electrolyte is then injected into the can. In this state, the can is sealed, thereby forming the secondary battery. An electrode terminal insulated from the can is provided at an upper portion of the secondary battery in order to form a cathode or an anode of the secondary battery. If the electrode terminal is an anode, the can serves as a cathode, and if the electrode terminal is a cathode, the can serves as an anode. Safety devices, such as a PTC (positive temperature coefficient) device, a thermal fuse, and a PCM (protective circuit module), are connected to the secondary battery. Such safety devices are electrically connected to the anode and the cathode of the secondary battery in order to prevent the secondary battery from being damaged or broken by shutting off current applied to the secondary battery if the voltage of the secondary battery is suddenly increased due to overcharge or over-discharge. The secondary battery equipped with the safety devices is accommodated in a case, thereby forming a secondary battery pack.

A secondary battery includes an electrode assembly, a negative electrode tap, a positive electrode tap, and a single support tape. The electrode assembly includes a positive electrode plate, a negative electrode plate, and a separator interposed between the positive electrode plate and the negative electrode plate, and wound in the form of a jelly roll. The negative electrode tap electrically connected to the negative electrode plate and the positive electrode tap electrically connected to the positive electrode plate are upwardly withdrawn from an upper portion of the electrode assembly. The electrode assembly wound in the form of a jelly roll is accommodated in a can having a hexahedral shape and made of metal, such as aluminum.

A single support tape having a predetermined length and a predetermined width is attached to a lower portion of the electrode assembly in order to allow the electrode assembly to be easily inserted into the can when the electrode assembly in the form of a jelly roll is inserted into the can. The single support tape completely surrounds the lower portion of the electrode assembly except for predetermined marginal regions of about 1 to 2 mm formed at both lower sides of the electrode assembly.

However, when performing a safety test on the secondary battery while accommodating the electrode assembly in a can, the electrode assembly being provided at its lower portion with the single support tape, the following problems may occur:

Firstly, when performing a battery safety test by pressing both lateral portions of the battery in a widthwise direction thereof in order to evaluate the possibility of firing in the battery, a middle portion of the battery is bent as the battery is compressed, so that the battery is folded. At this point, due to provision of the single support tape supporting the lower portion of the electrode assembly, a wrinkle may occur at a middle portion of a lower half of the electrode assembly. Thus, the possibility of fire in the battery due to a hard short may increase.

Secondly, if the signal support tape strongly grips the lower portion of the electrode assembly, electrolyte cannot sufficiently flow into the lower portion of the electrode assembly, thereby deteriorating performance and/or battery capacity of the battery.

Thirdly, since the single support tape substantially covers the entire area of the lower portion of the electrode assembly, a large amount of single support tape is necessary, resulting in increased manufacturing cost of the battery. Moreover, the single support tape is necessary only to allow the electrode assembly to be easily inserted into the can, and the single support tape may be released from the electrode assembly after the electrode assembly has been inserted into the can if the signal support tape is weakly attached to the lower portion of the electrode assembly. Thus, such excessive usage of the single support tape must be reconsidered.

SUMMARY OF THE INVENTION

The present invention has been developed in order to solve the above-mentioned problems occurring in the prior art, and an object of the present invention is to provide an electrode assembly capable of reducing the possibility of fire in a secondary battery caused by a hard short when the secondary battery is compressed due to external force applied thereto, capable of preventing battery performance from being deteriorated by allowing electrolyte to sufficiently flow into a lower portion of the electrode assembly, and capable of reducing the manufacturing cost of the secondary battery by minimizing the amount of separated support tape to be used.

To accomplish the above object, there is provided an electrode assembly comprising: a negative electrode plate, a positive electrode plate, and a separator for performing charge and discharge operations; and separated support tapes attached to a lower portion of the electrode assembly so as to allow the electrode assembly to be easily inserted into a can.

According to an exemplary embodiment of the present invention, the separated support tapes are symmetrically attached to the lower portion of the electrode assembly and about a center portion of the electrode assembly while being spaced apart from each other by a predetermined distance.

In addition, the separated support tapes can be asymmetrically attached to the lower portion of the electrode assembly and about a center portion of the electrode assembly while being spaced apart from each other by a predetermined distance.

According to the exemplary embodiment of the present invention, at least two separated support tapes are employed, each separated support tape being attached to a respective side of the lower portion of the electrode assembly.

The total length of the separated support tapes preferably is in a range of about ¼ to ¾ of the total width of the electrode assembly.

According to the exemplary embodiment of the present invention, a first side end of the separated support tape is spaced from a longitudinal center line of the electrode assembly by more than 10% of a total width of the electrode assembly, and a second side end of the separated support tape is spaced from one side end of the electrode assembly by more than 10% of the total width of the electrode assembly.

The separated support tape preferably has a height in a range of about 3 to 8 mm when the separated support tape is attached to the electrode assembly.

According to the exemplary embodiment of the present invention, the separated support tape preferably has a thickness of about 20 to 60 μm.

The separated support tape preferably has a tensile strength of at least 2 kgf/cm$^2$.

According to the exemplary embodiment of the present invention, the separated support tape preferably has an elongation of at least 50%.

The separated support tape is preferably made of material selected from the group consisting of polyimide, polyethylene, and polypropylene.

The separated support tape preferably has an adhesive strength of at least 20 g/mm, acryl-based adhesive is preferably coated on one surface of the separated support tape, and the separated support tape is preferably attached to the electrode assembly with pressure of 0.1 to 0.4 Mpa.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, an exemplary embodiment of the present invention will be described with reference to accompanying drawings.

Figure 1:
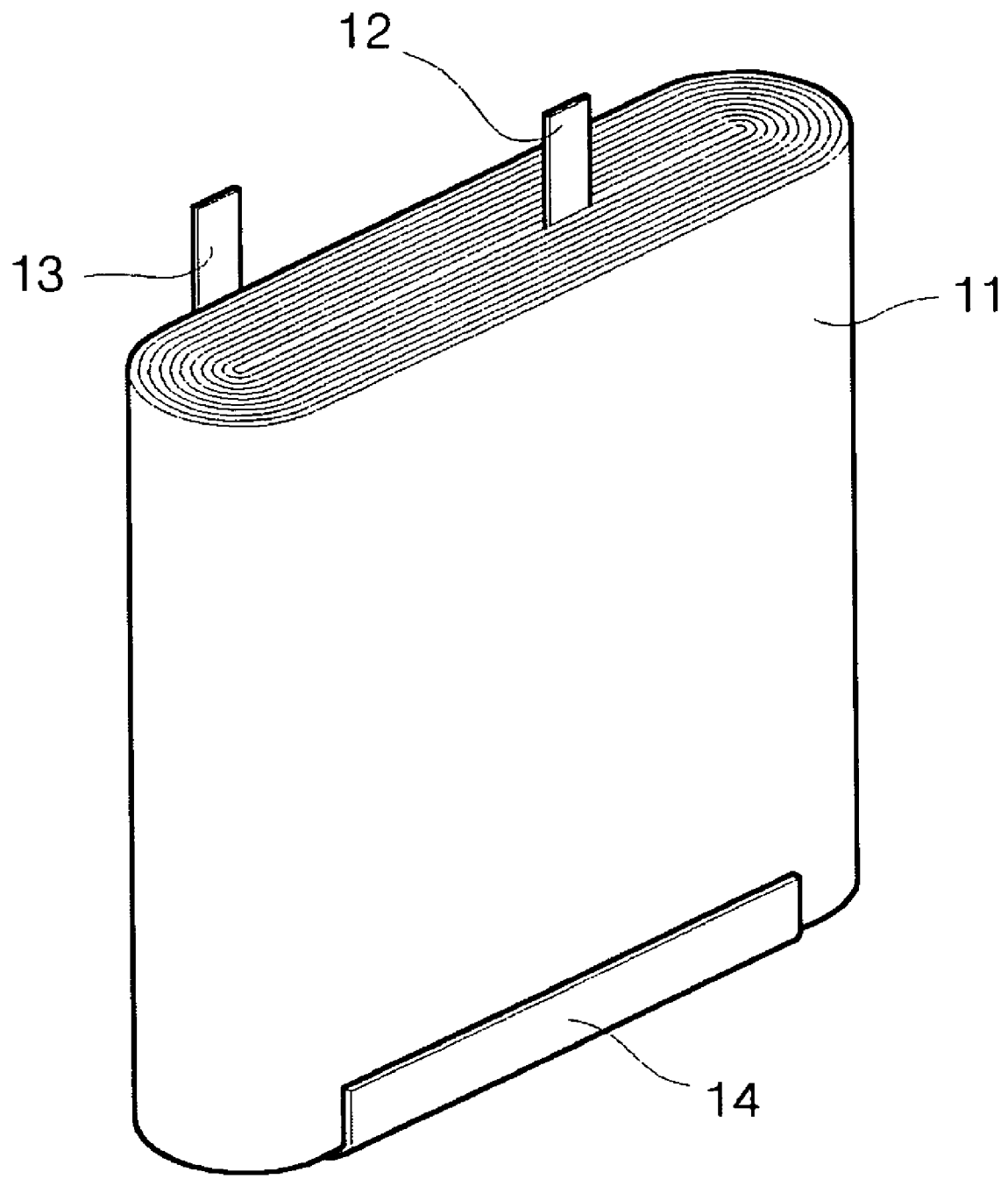
FIG. 1 is a perspective view showing an electrode assembly in the form of a jelly roll having a single support tape for allowing the electrode assembly to be easily inserted into a can.

FIG. 1 is perspective view showing an electrode assembly in the form of a jelly roll having a single support tape for allowing the electrode assembly to be easily inserted into a can.

Referring to FIG. 1, the secondary battery includes an electrode assembly 11, a negative electrode tap 12, a positive electrode tap 13, and a single support tape 14. Although not specifically shown in FIG. 1, the electrode assembly 11 includes a positive electrode plate, a negative electrode plate, and a separator interposed between the positive electrode plate and the negative electrode plate, and wound in the form of a jelly roll. The negative electrode tap 12 electrically connected to a negative electrode plate and the positive electrode tap 13 electrically connected to a positive electrode plate are upwardly withdrawn from an upper portion of the electrode assembly 11. The electrode assembly wound in the form of a jelly roll is accommodated in a can (not shown) having a hexahedral shape and made of metal, such as aluminum.

A single support tape 14 having a predetermined length and a predetermined width is attached to a lower portion of the electrode assembly 11 in order to allow the electrode assembly 11 to be easily inserted into the can when the electrode assembly 11 in the form of a jelly roll is inserted into the can. As shown in FIG. 1, the single support tape 14 completely surrounds the lower portion of the electrode assembly 11 except for predetermined marginal regions of about 1 to 2 mm formed at both lower sides of the electrode assembly 11.

Figure 2:
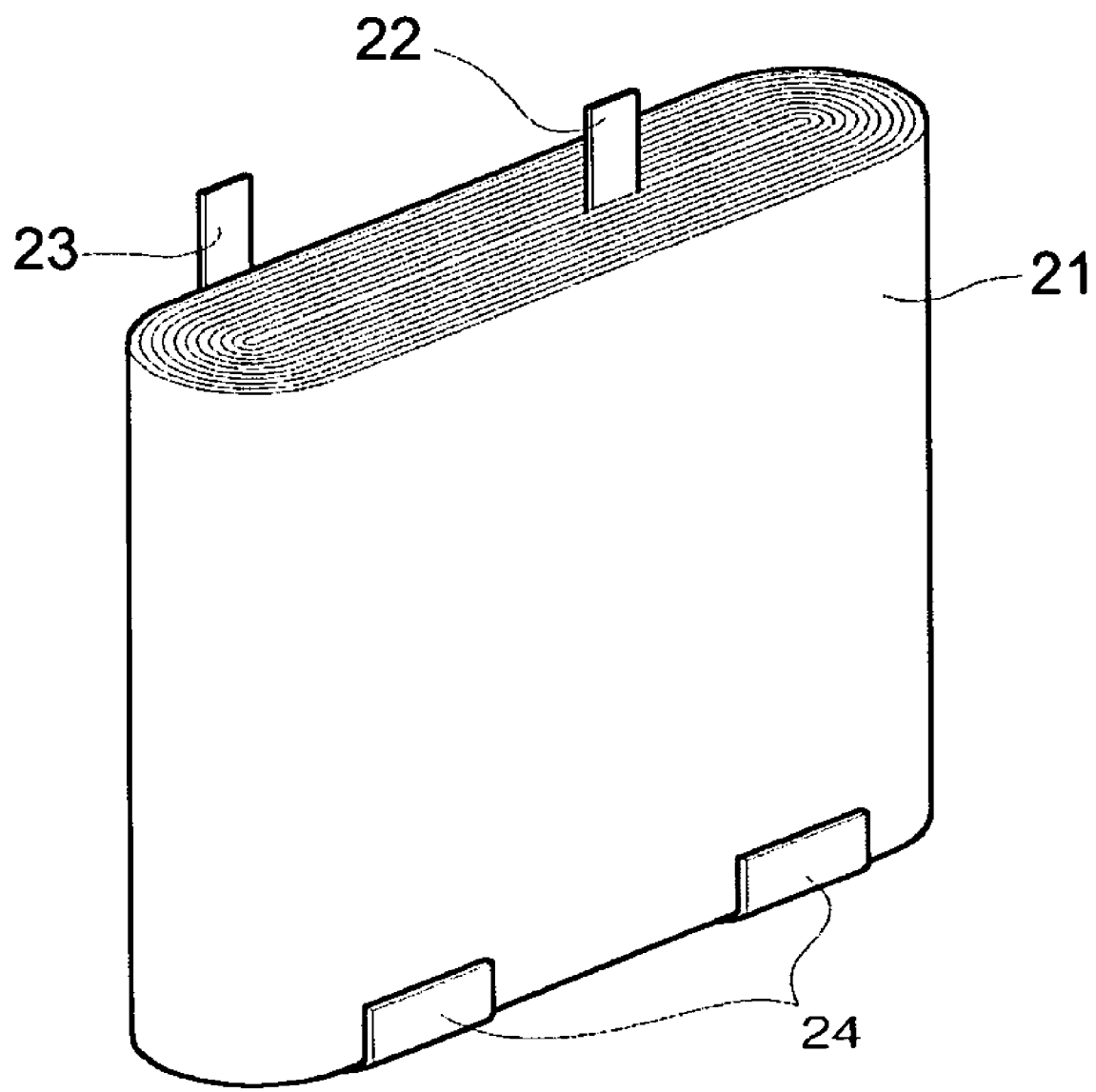
FIG. 2 is a perspective view showing an electrode assembly having separated support tapes according to an exemplary embodiment of the present invention.

FIG. 2 is a perspective view showing an electrode assembly having separated support tapes according to an exemplary embodiment of the present invention.

As shown in FIG. 2, the present invention includes an electrode assembly 21, a negative electrode tap 22, a positive electrode tap 23 and separated support tapes 24.

In order to fabricate the electrode assembly 21, active materials are coated on both surfaces of a collector. The collector is then dried and is subjected to a roll pressing process such that the collector is cut into a positive electrode plate and a negative electrode plate. In this state, the positive electrode plate and the negative electrode are wound after interposing a separator therebetween, thereby forming the electrode assembly 21. That is, after alternately aligning the positive electrode plate and the negative electrode plate about the separator, the positive electrode plate, the separator and the negative electrode plate are wound in a spiral pattern by using a winding mandrel having an oval shape, thereby forming the electrode assembly 21. The negative electrode plate is then further wound one more time at an outermost portion of the electrode assembly 21, and the electrode assembly 21 is sealed by means of tape. After forming the oval-shaped electrode assembly 21 in the form of a jelly roll, a pressing process is carried out with respect to the oval-shaped electrode assembly 21 in order to insert the oval-shaped electrode assembly 21 into a prismatic type can (not shown). The width of the positive electrode plate is preferably smaller than the width of the negative electrode plate, and the width of the negative electrode plate is preferably smaller than a width of the separator.

The positive electrode plate is formed by coating slurry, such as positive electrode active materials, binders or conductive agents, on both surfaces of a metal collector. For instance, the positive electrode plate is formed by uniformly coating a mixture (slurry or paste) consisting of a positive electrode material of LiNi$_x$Co$_y$O$_2$, a conductive agent of super-P, and a binder of polyvinylidenefluoride (PVDF), which are mixed with an inorganic solvent of N-methyl-2-pyrrolidone (NMP), on both surfaces of a collector made of aluminum foil. In this state, the collector is subjected to a drying process in order to remove the inorganic solvent, and the collector is then subjected to a roll pressing process so that a positive electrode plate having a thickness of about 0.147 mm is achieved.

The negative electrode plate is formed by coating slurry, such as positive electrode active materials, binders or conductive agents, on both surfaces of a metal collector. For instance, the negative electrode plate is formed by uniformly coating a mixture (slurry or paste) consisting of a positive electrode material of MCF and a binder of polyvinylidenefluoride (PVDF), which are mixed with an inorganic solvent of N-methyl-2-pyrrolidone (NMP), on both surfaces of a collector made of copper foil. In this state, the collector is subjected to a drying process in order to remove the inorganic solvent, and the collector is then subjected to a roll pressing process so that a negative electrode plate having a thickness of about 0.173 mm is achieved.

The separator is formed by using a polyethylene porous film having a thickness of about 0.025 mm, and which has a stability and rarely reacts with inorganic solvent.

The collector for forming the positive electrode plate and the negative electrode plate can be made of any materials as long as the materials are not subject to chemical change. In general, the collector is made of aluminum, copper, stainless, nickel, titan, or plastic carbon. In addition, surfaces of the collector can be coated with carbon, nickel, titan or silver. In a case of a lithium ion secondary battery, the positive electrode plate is made of aluminum foil and the negative electrode plate is made of copper foil considering such factors as oxidation resistant property, flexibility of the electrode, and cost. The thickness of the copper foil or aluminum foil is about 1 to 30 μm, preferably about 5 to 20 μm. However, the present invention is not limited to any particular thickness of the copper foil or aluminum foil.

Similar to the negative electrode plate, the negative electrode tap 22 is made of copper or nickel. The negative electrode tap 22 made of copper preferably has a width of about 1 to 10 mm and a thickness of about 5 to 50000 μm.

Similar to the positive electrode plate, the positive electrode tap 23 is made of aluminum or nickel. The positive electrode tap 23 made of aluminum preferably has a width of about 1 to 10 mm and a thickness of about 5 to 50000 μm.

The separated support tapes 24 surround a lower portion of the electrode assembly 21 up to a predetermined level or height. Each of the separated support tapes 24 is separately attached to a respective side portion of the electrode assembly 21 and about a center of the electrode assembly 21. Although FIG. 2 shows two separated support tapes 24, which are separately attached to respective side portions of the electrode assembly 21 and about the center of the electrode assembly 21, it is also possible to provide four separated support tapes. In this case, two support tapes 24 are attached to each side portion of the electrode assembly 21. Herein, the separated support tapes 24 are not provided in predetermined areas of the lower portion of the electrode assembly 21 adjacent to a longitudinal center line of the electrode assembly 21. Although it is more preferable that the electrode assembly 21 have no separated support tapes 24, in this case, the lower portion of the electrode assembly 21 may be damaged when the electrode assembly 21 is inserted into the can. Thus, it is preferable to set the total length of the separated support tapes 24 to ¼ to ¾ of the width of the electrode assembly 21 so that the separated support tapes 24 can sufficiently support the lower portion of the electrode assembly 21. If the total length of the separated support tapes 24 is less than ¼ of the width of the electrode assembly 21, the separated support tapes 24 cannot sufficiently support the electrode assembly 21. In addition, since the function of the separated support tapes 24 is to simply grip the lower portion of the electrode assembly 21 when the electrode assembly 21 is inserted into the can, it is not necessary for the total length of the separated support tapes 24 to be identical to the width of the electrode assembly 21. Specifically, it is not necessary that the total length of the separated support tapes 24 be more than ¾ of the width of the electrode assembly 21.

The separated support tapes 24 are preferably made of a material having a superior elongation property. Preferably, the separated support tapes 24 are made of a material having an elongation of at least 50%. If the elongation of the separated support tapes 24 is less than 50%, it is difficult for the separated support tapes 24 to closely grip the electrode assembly 21. In addition, the separated support tapes 24 must have a tensile strength of at least 2 kgf/cm². If the separated support tapes 24 have a tensile strength of less than 2 kgf/cm², the separated support tapes 24 cannot sufficiently support the electrode assembly 21. Preferably, the separated support tapes 24 are made of polyimide, polyethylene or polypropylene, which possess superior endurance against the electrolyte of the secondary battery.

In addition, acryl-based adhesive, which rarely reacts with the electrolyte of a secondary battery, and which has an adhesive force of at least 20 g/mm, is preferably coated on a surface of the separated support tapes 24. If the adhesive force of the acryl-based adhesive is less than 20 g/mm, the separated support tapes 24 cannot sufficiently support the electrode assembly 21.

Preferably, the separated support tapes 24 have a thickness of about 20 to 60 μm. If the separated support tapes 24 have a thickness less than 20 μm, the separated support tapes 24 cannot sufficiently support the electrode assembly 21. In contrast, if the separated support tapes 24 have a thickness of more than 60 μm, the thickness of the electrode assembly 21 may be increased.

In addition, preferably, the separated support tapes 24 have a height of about 3 to 8 mm when the separated support tapes 24 are attached to the electrode assembly 21. If the height of the separated support tapes 24 is less than 3 mm, a contact surface between the separated support tapes 24 and the electrode assembly 21 is too small, so that the separated support tapes 24 cannot be securely attached to the electrode assembly 21. In addition, if the height of the separated support tapes 24 exceeds 8 mm, not only is the thickness of the electrode assembly 21 increased, but also the amount of the separated support tapes 24 is unnecessarily increased.

In addition, it is preferable to protect the lower portion of the electrode assembly 21 from external pressure when the electrode assembly 21 has been inserted into the can. Thus, the separated support tapes 24 are preferably released from the lower portion of the electrode assembly 21 when the electrode assembly 21 has been inserted into the can. In the case wherein the separated support tapes 24 cannot be released from the lower portion of the electrode assembly 21, the influence of the separated support tapes 24 exerted on the lower portion of the electrode assembly 21 must be minimized. To this end, the pressure of a drum may be lowered when attaching the separated support tapes 24 to the electrode assembly 21. That is, the pressure applied by the drum, which attaches the separated support tapes 24 to the electrode assembly 21, is set in a range of about 0.1 to 0.4 Mpa. If the pressure of the drum is less than 0.1 Mpa, the separated support tapes 24 cannot be attached to the electrode assembly 21.

Figure 3:
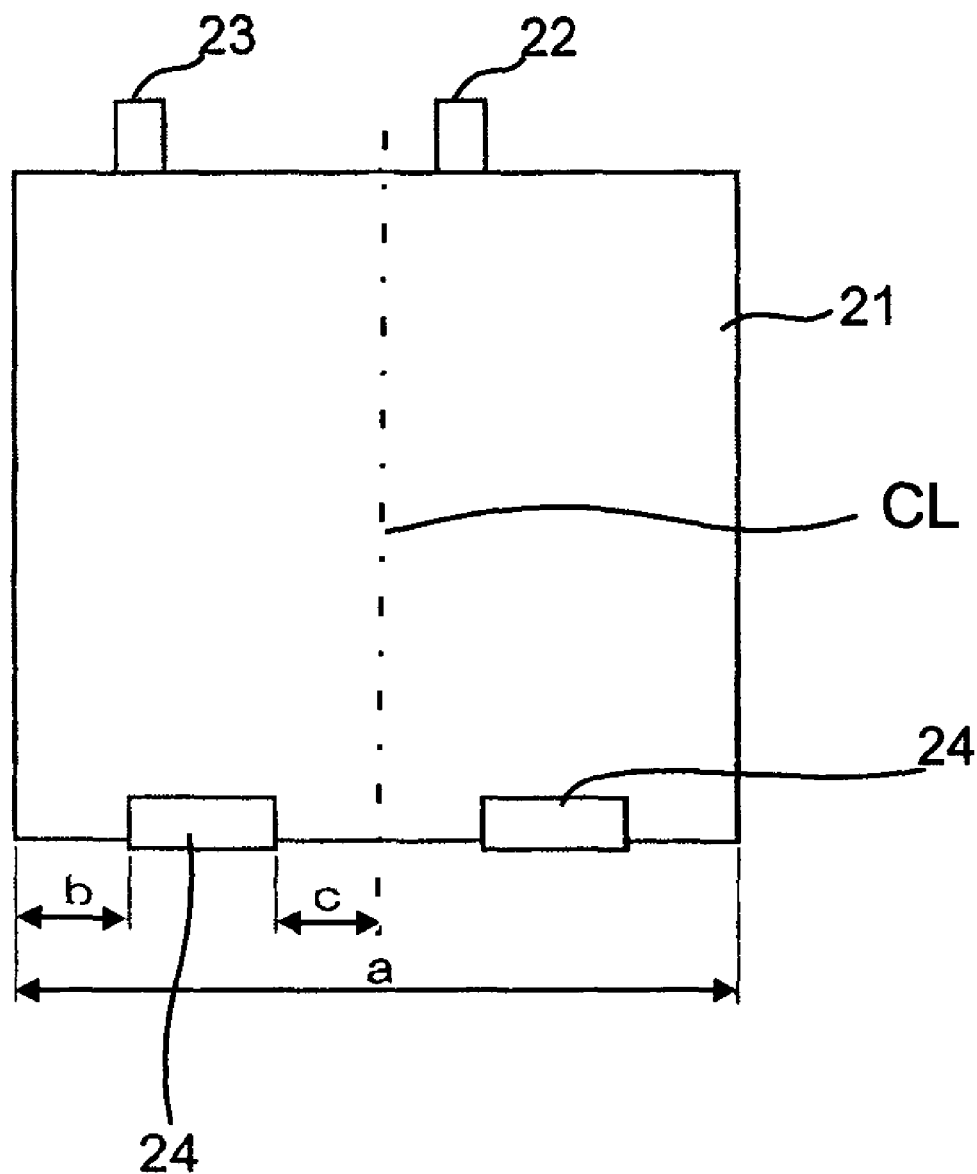
FIG. 3 is a front sectional view showing separated support tapes attached to a lower portion of an electrode assembly according to an exemplary embodiment of the present invention.

FIG. 3 is a front sectional view showing separated support tapes attached to a lower portion of an electrode assembly according to an exemplary embodiment of the present invention.

Referring to FIG. 3, two separated support tapes 24 are attached to respective sides of the lower portion of the electrode assembly 21 while being spaced apart from each other by a predetermined distance about a longitudinal center line CL of the electrode assembly 21. On the assumption that the total width of the electrode assembly 21 is "a", that the distance between one side end of the electrode assembly 21 and one side end of the separated support tapes 24 is "b", and that the distance between a longitudinal center line CL of the electrode assembly 21 and the other side end of the separated support tapes 24 is "c", a compression test for the secondary battery was carried out while varying the width of the separated support tapes 24. As a result, various possibilities of fire for the secondary battery are represented as shown in following experimental examples 1 to 4. The compression test was carried out by applying compression force of 13 KN to the charged secondary battery for two seconds while laterally aligning a charged secondary battery in parallel to jigs gripping the charged secondary battery. In addition, after releasing the secondary battery from the jigs, the possibility of fire in the secondary battery was determined.

Experimental Example 1

When the compression test was carried out under the condition of $b/a=0$ and $c/a=0$, a possibility of fire for the secondary battery was about 30%.

Experimental Example 2

When the compression test was carried out under the condition of $b/a=0.1$ and $c/a=0$, the rate of fire in the secondary battery was about 20%.

Experimental Example 3

When the compression test was carried out under the condition of $b/a=0$ and $c/a=0.1$, the rate of fire in the secondary battery was about 20%.

Experimental Example 4

When the compression test was carried out under the condition of $b/a=0.1$ and $c/a=0.1$, the rate of fire in the secondary battery was about 5%.

As understood from the above experimental examples, if $b/a$ and $c/a$ are at least 0.1, the rate of fire in the secondary battery is significantly reduced. Accordingly, it is preferable to place the separated support tapes 24 away from the longitudinal center line CL of the electrode assembly 21 by at least or more than 10% of the total width of the electrode assembly 21. In addition, it is preferable to place one side end of the separated support tapes 24 away from one side end of the electrode assembly 21 by at least or more than 10% of the total width of the electrode assembly 21. In consideration of the possibility of insertion failure occurring when inserting the electrode assembly 21 into the can, the other side end of the separated support tapes 24 must be spaced from the longitudinal center line CL of the electrode assembly 21 by at least or more than 10% of the total width of the electrode assembly 21. In this case, it does not matter that one side end of the separated support tapes 24 is spaced from one side end of the electrode assembly 21 by 1 to 2 mm.

As described above, the electrode assembly having the separated support tape according to the present invention reduces the possibility of fire in the secondary battery caused by a hard short when the secondary battery is collapsed due to external force applied thereto, prevents battery performance from being deteriorated by allowing the electrolyte to flow sufficiently into the lower portion of the electrode assembly, and reduces manufacturing cost of the secondary battery by minimizing the amount of separated support tape to be used.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

What is claimed is:

1. An electrode assembly, comprising:
a negative electrode plate,
a positive electrode plate, and
a separator for performing charge and discharge operations, the positive electrode plate and negative electrode plate and separator combined into a prismatic shape having six sides,
   a top side having at least one terminal connected to one of the positive and negative plates,
   a bottom side arranged opposite to the top side, and four sides arranged between the top and bottom sides,
   a first pair of the four sides arranged opposite to each other and
   a second pair of the four sides also arranged opposite to each other, the width of each of the first pair of sides being wider than the width of each of the second pair of sides the, two wider sides facing each other, the two narrower sides facing each other, and the top and bottom sides facing each other; and
separated support tapes attached to the bottom of the electrode assembly to facilitate the electrode assembly being easily inserted into a can, each support tape having a channel shape including a top portion, a bottom portion and two opposite sidewall portions, wherein the top portion and the bottom portion are paralleled with the bottom side of the prismatic shape, wherein the two opposite sidewall portions include a first side end connecting one end of the top portion and one end of the bottom portion and a second side end connecting the other end of the top portion and one end of the bottom portion;
wherein the separated support tapes are attached symmetrically about a longitudinal center line of the electrode assembly while being spaced apart from each other by a predetermined distance, the separated support tapes spaced apart so as to not touch each other and the bottom portion of each support tape being parallel to and attached to the bottom side of the electrode assembly and the respective sides of each support tape being attached to respective wider sides of the electrode assembly; and
wherein the first side end of each of the separated support tapes is spaced from the longitudinal center line of the electrode assembly by at least 10% of a total width of one of the wider sides of the electrode assembly, and
the second side end of each of the separated support tapes is spaced from both said two wider side ends of the electrode assembly by at least 10% of the total width of one of the wider sides of the electrode assembly,
wherein the top side of the electrode assembly is not attached by the separated support tapes so that the top side of the electrode assembly is completely exposed.

2. An electrode assembly, comprising:
a negative electrode plate,
a positive electrode plate, and
a separator for performing charge and discharge operations, the positive electrode plate and negative electrode plate and separator combined into a prismatic shape having six sides,
   a top side having at least one terminal connected to one of the positive and negative plates,
   a bottom side arranged opposite to the top side, and four sides arranged between the top and bottom sides,
   a first pair of the four sides arranged opposite to each other and a second pair of the four sides also arranged opposite to each other, the width of each of the first pair of sides being wider than the width of each of the second pair of sides the, two wider sides facing each other, the two narrower sides facing each other, and the top and bottom sides facing each other; and separated support tapes attached to the bottom portion of the electrode assembly to facilitate the electrode assembly being easily inserted into a can, each support tape having a channel shape including a top portion, a bottom portion and two opposite sidewall portions, wherein the top portion and the bottom portion are paralleled with the bottom side of the prismatic shape, wherein the two opposite sidewall portions include a first side end connecting one end of the top portion and one end of the bottom portion and a second side end connecting the other end of the top portion and one end of the bottom portion;

wherein the separated support tapes are attached asymmetrically about a longitudinal center line of the electrode assembly while being spaced apart from each other by a predetermined distance, the separated support tapes spaced apart so as to not touch each other and the bottom portion of each support tape being parallel to and attached to the bottom side of the electrode assembly and the respective sides of each support tape being attached to respective wider sides of the electrode assembly; and wherein the first side end of each of the separated support tapes is spaced from the longitudinal center line of the electrode assembly by at least 10% of a total width of one of the wider sides of the electrode assembly, and the second side end of each of the separated support tapes is spaced from both said two wider side ends of the electrode assembly by at least 10% of the total width of one of the wider sides of the electrode assembly, wherein the top side of the electrode assembly is not attached by the separated support tapes so that the top side of the electrode assembly is completely exposed.

3. An electrode assembly, comprising:

a negative electrode plate, a positive electrode plate, and a separator for performing charge and discharge operations, the positive electrode plate and negative electrode plate and separator combined into a prismatic shape having six sides, a top side having at least one terminal connected to one of the positive and negative plates, a bottom side arranged opposite to the top side, and four sides arranged between the top and bottom sides, a first pair of the four sides arranged opposite to each other and a second pair of the four sides also arranged opposite to each other, the width of each of the first pair of sides being wider than the width of each of the second pair of sides the, two wider sides facing each other, the two narrower sides facing each other, and the top and bottom sides facing each other; and separated support tapes attached to the bottom side of the electrode assembly to facilitate the electrode assembly being easily inserted into a can, each support tape having a channel shape including a top portion, a bottom portion and two opposite sidewall portions, wherein the top portion and the bottom portion are paralleled with the bottom side of the prismatic shape, wherein the two opposite sidewall portions include a first side end connecting one end of the top portion and one end of the bottom portion and a second side end connecting the other end of the top portion and one end of the bottom portion;

wherein said separated support tapes include two separated support tapes, the bottom portion of each separated support tape being attached to and parallel to the bottom side of the electrode assembly, the separated support tapes spaced apart to not touch each other and the respective sides of each support tape being attached to respective wider sides of the electrode assembly; and wherein the first side end of each of the separated support tapes is spaced from the longitudinal center line of the electrode assembly by at least 10% of a total width of one of the wider sides of the electrode assembly, and the second side end of each of the separated support tapes is spaced from both said two wider side ends of the electrode assembly by at least 10% of the total width of one of the wider sides of the electrode assembly, wherein the top side of the electrode assembly is not attached by the separated support tapes so that the top side of the electrode assembly is completely exposed.

4. An electrode assembly, comprising:

a negative electrode plate, a positive electrode plate, and a separator for performing charge and discharge operations, the positive electrode plate and negative electrode plate and separator combined into a prismatic shape having six sides, a top side having at least one terminal connected to one of the positive and negative plates, a bottom side arranged opposite to the top side, and four sides arranged between the top and bottom sides, a first pair of the four sides arranged opposite to each other and a second pair of the four sides also arranged opposite to each other, the width of each of the first pair of sides being wider than the width of each of the second pair of sides the, two wider sides facing each other, the two narrower sides facing each other, and the top and bottom sides facing each other; and separated support tapes attached to the bottom side of the electrode assembly to facilitate the electrode assembly being easily inserted into a can, each support tape having a channel shape including a top portion, a bottom portion and two opposite sidewall portions, wherein the top portion and the bottom portion are paralleled with the bottom side of the prismatic shape, wherein the two opposite sidewall portions include a first side end connecting one end of the top portion and one end of the bottom portion and a second side end connecting the other end of the top portion and one end of the bottom portion;

wherein said separated support tapes include at least two separated support tapes, each separated support tape being attached to two wider sides of the electrode assembly, the separated support tapes spaced apart to not touch each other and each support tape including a bottom portion parallel to the bottom side of the electrode assembly; and wherein the first side end of each of the separated support tapes is spaced from the longitudinal center line of the electrode assembly by at least 10% of a total width of one of the wider sides of the electrode assembly, and the second side end of each of the separated support tapes is spaced from both said two wider side ends of the electrode assembly by at least 10% of the total width of one of the wider sides of the electrode assembly, wherein the top side of the electrode assembly is not attached by the separated support tapes so that the top side of the electrode assembly is completely exposed.

5. The electrode assembly as claimed in claim 1, wherein a total length of the separated support tapes is in a range of ¼ to ¾ of a total width of the electrode assembly.

6. The electrode assembly as claimed in claim 1, wherein the two opposite sidewall portions of each of the separated support tapes have a height in a range of 3 to 8 mm when the separated support tapes are attached to the electrode assembly.

7. The electrode assembly as claimed in claim 1, wherein the separated support tapes have a thickness in a range of 20 to 60 μm.

8. The electrode assembly as claimed in claim 1, wherein the separated support tapes have a tensile strength of at least 2 kgf/cm$^2$.

9. The electrode assembly as claimed in claim 1, wherein the separated support tapes have an elongation of at least 50%.

10. The electrode assembly as claimed in claim 1, wherein the separated support tapes are made of material selected from a group consisting of polyimide, polyethylene and polypropylene.

11. The electrode assembly as claimed in claim 1, wherein the separated support tapes have an adhesive strength of at least 20 g/mm.

12. The electrode assembly as claimed in claim 1, wherein an acryl-based adhesive is coated on one surface of the separated support tapes.

13. The electrode assembly as claimed in claim 1, wherein the separated support tapes are attached to the electrode assembly with a pressure in a range of 0.1 to 0.4 Mpa.

14. The electrode assembly as claimed in claim 2, wherein a total length of the separated support tapes is in a range of ¼ to ¾ of a total width of the electrode assembly.

15. The electrode assembly as claimed in claim 2, wherein the separated support tapes have a thickness in a range of 20 to 60 μm.

16. The electrode assembly as claimed in claim 2, wherein the separated support tapes have a tensile strength of at least 2 kgf/cm$^2$.

17. The electrode assembly as claimed in claim 3, wherein a total length of the separated support tapes is in a range of ¼ to ¾ of a total width of the electrode assembly.

18. The electrode assembly as claimed in claim 4, wherein a total length of the separated support tapes is in a range of ¼ to ¾ of a total width of the electrode assembly.

* * * * *